Nov. 16, 1948.  C. E. GARDNER  2,453,984
PRODUCTION OF THREAD
Filed Oct. 27, 1947

Inventor
CHARLES E. GARDNER
By R. H. Waters
Attorney

Patented Nov. 16, 1948

2,453,984

UNITED STATES PATENT OFFICE 2,453,984

PRODUCTION OF THREAD

Charles E. Gardner, Hollis, N. Y., assignor to Wingfoot Corporation, Akron, Ohio, a corporation of Delaware Application October 27, 1947, Serial No. 782,383

1 Claim. (Cl. 57—157)

This invention relates to the production of a twisted thread of a heat-stretchable heat-sealable material. The thread is produced from a narrow film or ribbon of the material by first twisting it and then heating and stretching the twisted thread. The invention includes the process and the apparatus for carrying it out.

In the production of thread from heat-sealable and stretchable film material, it has previously been proposed to twist and stretch and heat-seal overlapping plies of the film material in a single operation. The thread produced has not been too satisfactory because for one reason it is not of uniform diameter. The thread of the present invention is more uniform, both in appearance and in physical properties.

The thread may be produced from any heat-sealable and heat-stretchable film material. The material most suited to its production is rubber hydrochloride film because after heating, rubber hydrochloride film retains the property of stretchability and sealability for a considerable period even though it is allowed to cool. It is, therefore, not necessary to maintain rubber hydrochloride in a heated condition throughout the stretching and sealing operation. Other film materials must be maintained at the stretching and sealing temperature and this generally necessitates enclosing the equipment and carrying out the stretching and sealing in an oven or the like.

The invention will be more particularly described in connection with the production of thread from rubber hydrochloride film. The process and apparatus will be further described in connection with the accompanying drawings.

Figure 1:
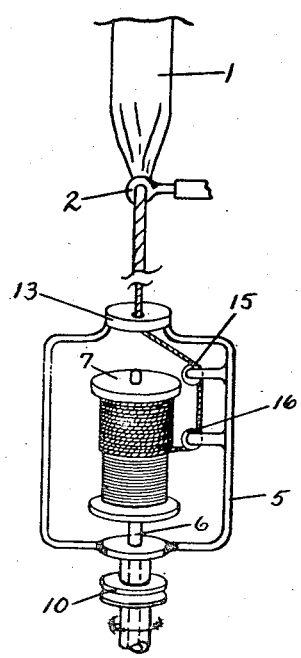
Figure 2:
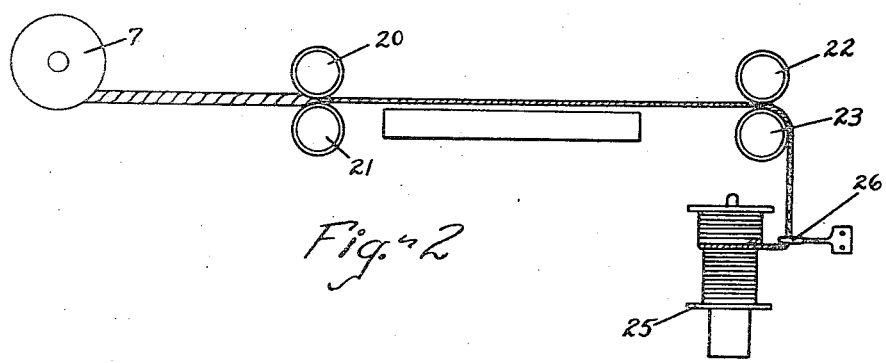

In the drawings, Fig. 1 is a front view of equipment used for twisting the film, and shows film being twisted. Fig. 2 is a side view of sealing and stretching equipment and shows the thread being sealed and stretched.

The rubber hydrochloride film 1 may be about 1/1000 of an inch thick more or less, and may be a quarter of an inch wide, more or less. It is gathered and fed through the eye 2 of the twister which includes the spinner 5 and the rotatable spindle 6 for the spool 7. The pulley 10 is provided to turn the spinner 5. The spindle 6 may be rotated in the opposite direction.

The twisted film, after it leaves the eye 2 passes through the band 13 and over the small pulleys 15 and 16 inside the twister. From these it is wound onto the spool 7. The twister 5 turns rapidly with respect to the spindle, and it is this turning motion that imparts the twist to the film. By turning he spindle 6 in the reverse direction, the number of turns to the inch is lessened. If the spindle is turned in the same direction as the spool but at a lower speed, the number of turns per inch is increased. It will be noticed that as the twisted film approaches the spinner 5 it is twisted more compactly and its diameter becomes smaller.

After the film has all been twisted and wound onto the spool 7, it is transferred to equipment illustrated more or less diagrammatically in Fig. 2. Here the twisted thread is passed between the heated rollers 20 and 21. One or both of these rollers 20 and 21 may be grooved to facilitate uniform heating of the thread as it passes through the groove. From the heated rollers, the thread passes through the pull rolls 22 and 23 which may likewise be grooved and may be cooled. These latter rolls travel at a greater speed than the rolls 20 and 21, so that the twisted thread is stretched as it passes from the one pair of rollers to the other. The stretched thread is then wound on the spool 25. It is passed down through the ring 26 and either the ring moves up and down as the stretched thread is wound onto the spool or the ring remains stationary as the spool is moved up and down.

The thread may be stretched in this manner as much as several hundred per cent. The heating caused by the rolls 20, 21 will not only make the thread soft and more easily stretched, but it likewise causes overlapping portions of the film to unite. The pressure on the contacting surfaces of the overlapping portions of the film, as the spirally wound film is placed under tension, causes these surfaces to coalesce into one another without any further application of pressure.

The process is applicable to films of different width and films of different thickness and composition, and twisted thread of any desired diameter may be produced. The diameter will depend upon the amount the film is stretched, i. e., the ratio of the speed of the rolls 22, 23 to the speed of the rolls 20, 21.

The invenion is defined in the appended claim.

What I claim is:

The method of producing twisted thread from a ribbon of a heat-sealable and heat-stretchable film material which comprises twisting the film into a filament and then heating it and pulling the twisted film so as to elongate it, and bringing contacting surfaces of overlapping portions of the twisted film into pressure contact to cause them to become permanently sealed to one another.

CHARLES E. GARDNER.

REFERENCES CITED

The following references are of record in the file of this patent:

UNITED STATES PATENTS

| Number | Name | Date |
|---|---|---|
| 2,256,150 | Mallory | Sept. 16, 1941 |
| 2,336,100 | Jacque | Dec. 7, 1943 |